(12) United States Patent
Kanayama et al.

(10) Patent No.: US 10,052,999 B2
(45) Date of Patent: *Aug. 21, 2018

(54) LIGHTING APPARATUS AND AUTOMOBILE INCLUDING THE SAME

(71) Applicant: PANASONIC INTELLECTUAL PROPERTY MANAGEMENT CO., LTD., Osaka (JP)

(72) Inventors: Yoshihiko Kanayama, Hyogo (JP); Hiro Aoki, Osaka (JP); Makoto Kai, Kyoto (JP); Tomoyuki Ogata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/722,251

(22) Filed: Oct. 2, 2017

(65) Prior Publication Data

US 2018/0038570 A1 Feb. 8, 2018

Related U.S. Application Data

(63) Continuation of application No. 14/693,152, filed on Apr. 22, 2015, now Pat. No. 9,810,396.

(30) Foreign Application Priority Data

May 9, 2014 (JP) ................................ 2014-098145

(51) Int. Cl.
*B60Q 1/18* (2006.01)
*B60Q 1/04* (2006.01)
(Continued)

(52) U.S. Cl.
CPC ................ *B60Q 1/18* (2013.01); *B60Q 1/04* (2013.01); *F21S 41/143* (2018.01);
(Continued)

(58) Field of Classification Search
CPC .. F21S 48/328; F21S 48/1104; F21S 48/1154; F21S 48/1159; F21S 48/1225;
(Continued)

(56) References Cited

U.S. PATENT DOCUMENTS 7,156,544 B2 1/2007 Ishida
7,311,430 B2 12/2007 Tsukamoto
(Continued)

FOREIGN PATENT DOCUMENTS

CN 203349120 12/2013
JP 2005-108554 4/2005
(Continued)

OTHER PUBLICATIONS

Office Action in Chinese Patent Application No. 201510223753.3, dated Dec. 30, 2016, with English language translation.
(Continued)

*Primary Examiner* — Laura Tso
(74) *Attorney, Agent, or Firm* — Greenblum & Bernstein, P.L.C.

(57) ABSTRACT

A lighting apparatus for vehicle use that projects light forward includes a base, a low beam lamp including a low beam light emitter disposed on the base, a first light emitter disposed on the base and a second light emitter. A lighting controller turns on the low beam light emitter, the first light emitter, and the second light emitter, and an optical system reflects light from the first and second light emitters at least above and below the first and second light emitters, to produce a light distribution pattern. Centers of areas illumi-
(Continued)

nated by the light from the first and second light emitters are horizontally spaced from each other.

10 Claims, 12 Drawing Sheets

(51) Int. Cl.
| | | |
|---|---|---|
| *F21S 41/19* | (2018.01) | |
| *F21S 41/143* | (2018.01) | |
| *F21S 41/147* | (2018.01) | |
| *F21S 41/20* | (2018.01) | |
| *F21S 41/24* | (2018.01) | |
| *F21S 41/255* | (2018.01) | |
| *F21S 41/43* | (2018.01) | |
| *F21S 41/60* | (2018.01) | |
| *F21S 41/663* | (2018.01) | |
| *F21S 45/47* | (2018.01) | |
| *F21Y 115/10* | (2016.01) | |

(52) U.S. Cl.
CPC ............ *F21S 41/147* (2018.01); *F21S 41/19* (2018.01); *F21S 41/24* (2018.01); *F21S 41/255* (2018.01); *F21S 41/285* (2018.01); *F21S 41/43* (2018.01); *F21S 41/60* (2018.01); *F21S 41/663* (2018.01); *F21S 45/47* (2018.01); *F21Y 2115/10* (2016.08)

(58) Field of Classification Search
CPC .. F21S 48/1241; F21S 48/1258; F21S 48/145; F21S 48/1705; F21S 48/1748; B60C 1/04; B60C 1/18; F21Y 2115/10

USPC ......................... 362/543, 544, 545, 522, 538
See application file for complete search history.

(56) References Cited

U.S. PATENT DOCUMENTS

| | | | |
|---|---|---|---|
| 9,765,940 B2 * | 9/2017 | Kanayama | ........... F21S 48/1154 |
| 9,810,396 B2 * | 11/2017 | Kanayama | ............ F21S 48/328 |
| 2005/0068787 A1 * | 3/2005 | Ishida | ...................... B60Q 1/14 |
| | | | 362/538 |
| 2005/0099067 A1 | 5/2005 | Matsubara | |
| 2007/0103923 A1 | 5/2007 | Fukawa | |
| 2011/0012510 A1 | 1/2011 | Tani et al. | |
| 2012/0195058 A1 | 8/2012 | Uchida | |
| 2015/0260364 A1 | 9/2015 | Kliebisch | |
| 2015/0323145 A1 | 11/2015 | Kanayama | |

FOREIGN PATENT DOCUMENTS

| | | |
|---|---|---|
| JP | 2005-138708 | 6/2005 |
| JP | 2008-21604 | 1/2008 |
| JP | 2010-153269 | 7/2010 |
| JP | 2011-20559 | 2/2011 |
| JP | 2012-156051 | 8/2012 |
| JP | 2014-38701 | 2/2014 |
| WO | 2014/037320 | 3/2014 |

OTHER PUBLICATIONS

Office Action in Japanese Patent Application No. 2014-098145, dated Nov. 14, 2017.

* cited by examiner

LIGHTING APPARATUS AND AUTOMOBILE INCLUDING THE SAME

CROSS REFERENCE TO RELATED APPLICATION

This is a continuation application of U.S. patent application Ser. No. 14/693,152, filed Apr. 22, 2015, which claims the benefit of priority of Japanese Patent Application Number 2014-098145, filed May 9, 2014, the entire content of which is hereby incorporated by reference.

BACKGROUND OF THE INVENTION

1. Field of the Invention

The present disclosure relates to a lighting apparatus and an automobile including the lighting apparatus.

2. Description of the Related Art

Vehicles such as automobiles are equipped with headlights in the front. These headlights include a housing (chassis) and a lighting apparatus attached to the housing. Lighting apparatuses used in vehicle headlights include, for example, a base, a low beam light emitting device and a high beam light emitting device disposed on the base, and a lens positioned in front of the low beam light emitting device and the high beam light emitting device (see Japanese Unexamined Patent Application Publication No. 2005-108554).

Examples of conventional low beam light emitting devices and high beam light emitting devices used include high intensity discharge (HID) lamps. In recent years, due to the luminous efficiency and long lifespan of light emitting diodes (LEDs), which exceed HID lamps, lighting apparatuses using LEDs as the low beam light emitting devices and high beam light emitting devices have been researched and developed.

SUMMARY OF THE INVENTION

With the conventional lighting apparatus described above, power consumption cannot be reduced.

For example, when the high beam light emitting device is used, a wide area, spanning from directly in front of the driver to far away from the driver, must be brightly illuminated. To brightly illuminate this wide area, the high beam light emitting device must output enough light to achieve an extremely high illuminance, which results in excessive power consumption.

An object of the present disclosure is to provide a lighting apparatus and automobile capable of reducing power consumption.

In order to achieve the aforementioned object, according to one aspect of the present disclosure, a lighting apparatus for vehicle use that projects light forward is provided. The lighting apparatus includes: a base; a low beam lamp including a low beam light emitting device disposed on the base; a first high beam lamp including a first high beam light emitting device disposed on the base; a second high beam lamp including a second high beam light emitting device disposed on the base; and a lighting controller configured to turn on the low beam light emitting device, the first high beam light emitting device, and the second high beam light emitting device when high beams are turned on. A center of an area illuminated by the first high beam lamp and a center of an area illuminated by the second high beam lamp are horizontally spaced apart from each other.

Accordingly, power consumption can be reduced.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENT

Hereinafter, a lighting apparatus and automobile according to an embodiment are described in detail with reference to the accompanying drawings. Note that the embodiment described below shows a specific preferred example of the present disclosure. Therefore, the numerical values, shapes, materials, structural elements, arrangement and connection of the structural elements, etc., shown in the following embodiment are mere examples, and are not intended to limit the present disclosure. Consequently, among the structural elements in the following embodiment, elements not recited in any one of the independent claims which indicate the broadest concepts of the present disclosure are described as arbitrary structural elements.

As described herein, "front" and "forward" refer to the direction in which light is emitted from the lighting apparatus (i.e., the light-emitting direction) and the light-extraction direction in which light is extracted, and "back" and "behind" refer to the direction opposite the front/forward direction. Furthermore, "front" and "forward" refer to the direction of travel when an automobile moves forward, "right" and "left" are from the perspective of the driver, "up", "upward", and "above" refer to the direction toward the ceiling of the automobile, and "down", "downward", and "below" refer to the direction opposite the up/upward/above direction. Additionally, the Z axis corresponds to the anteroposterior directions, the Y axis corresponds to the up and down (vertical) directions, and the X axis corresponds to the left and right (horizontal, lateral) directions.

Note that the respective figures are schematic diagrams and are not necessarily precise illustrations. Additionally, like structural elements share the same reference numbers.

Embodiment

Figure 1:
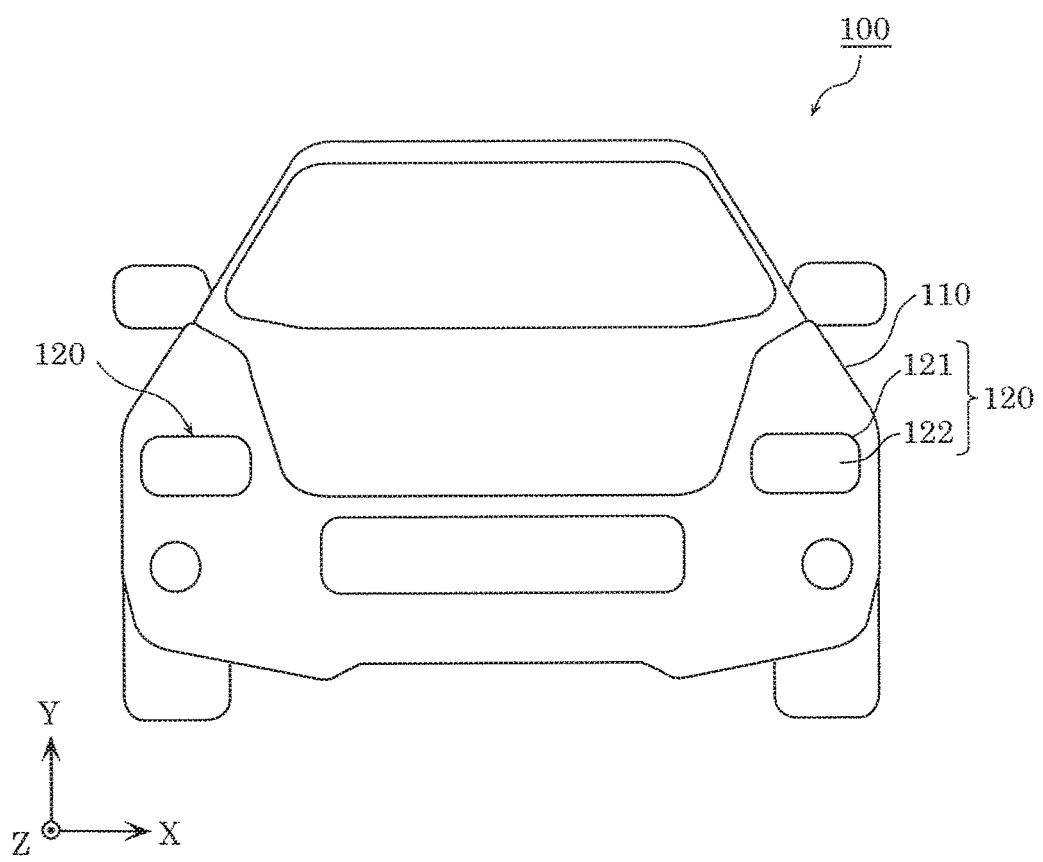
FIG. 1 is a front view of an automobile according to an embodiment of the present disclosure.

First, automobile 100 according to an embodiment will be described with reference to FIG. 1. FIG. 1 is a front view of the automobile according to the embodiment.

As illustrated in FIG. 1, automobile 100 is one example of a vehicle, such as a four-wheeled automobile, and includes vehicle body 110 and a pair of headlights 120 disposed on the left and right sides of the front of vehicle body 110. Automobile 100 is, for example, an automobile propelled by a gasoline engine or an automobile propelled by an electric engine.

In the embodiment, headlights 120 are headlight assemblies used in a vehicle and include housing 121, front cover 122, and a lighting apparatus (not shown in FIG. 1) that is attached to housing 121 behind front cover 122.

Housing 121 is, for example, a metal chassis and has an opening from which light emitted from the lighting apparatus exits. Front cover 122 is a headlight cover that transmits light and covers the opening of housing 121. Housing 121 and front cover 122 are sealed together so as to keep water and dust from entering housing 121.

The lighting apparatus is disposed behind front cover 122 and attached to housing 121. The light emitted by the lighting apparatus transmits through front cover 122 and travels outward.

Lighting Apparatus

Figure 2:
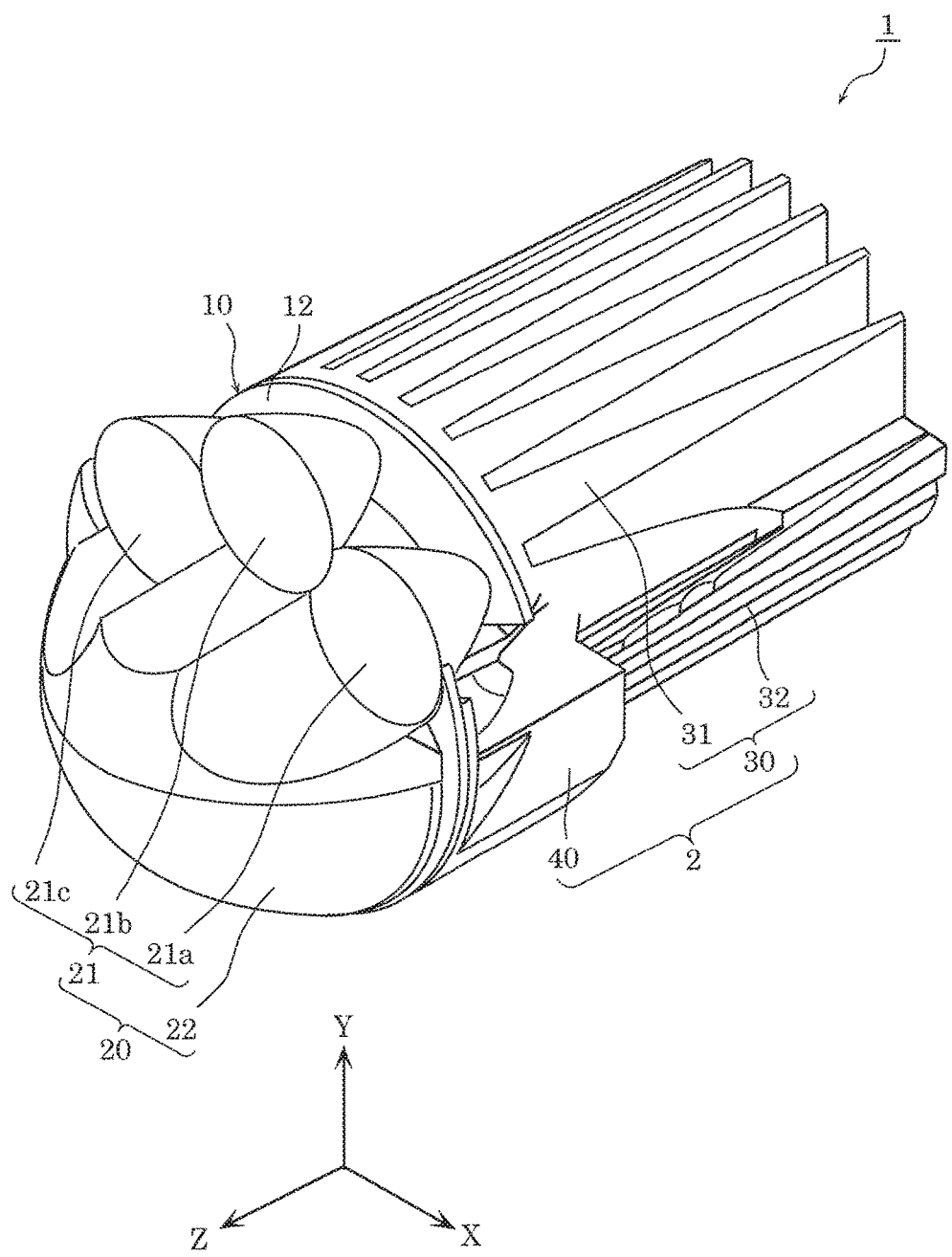
FIG. 2 is a perspective view of a lighting apparatus according to an embodiment of the present disclosure.
Figure 3:
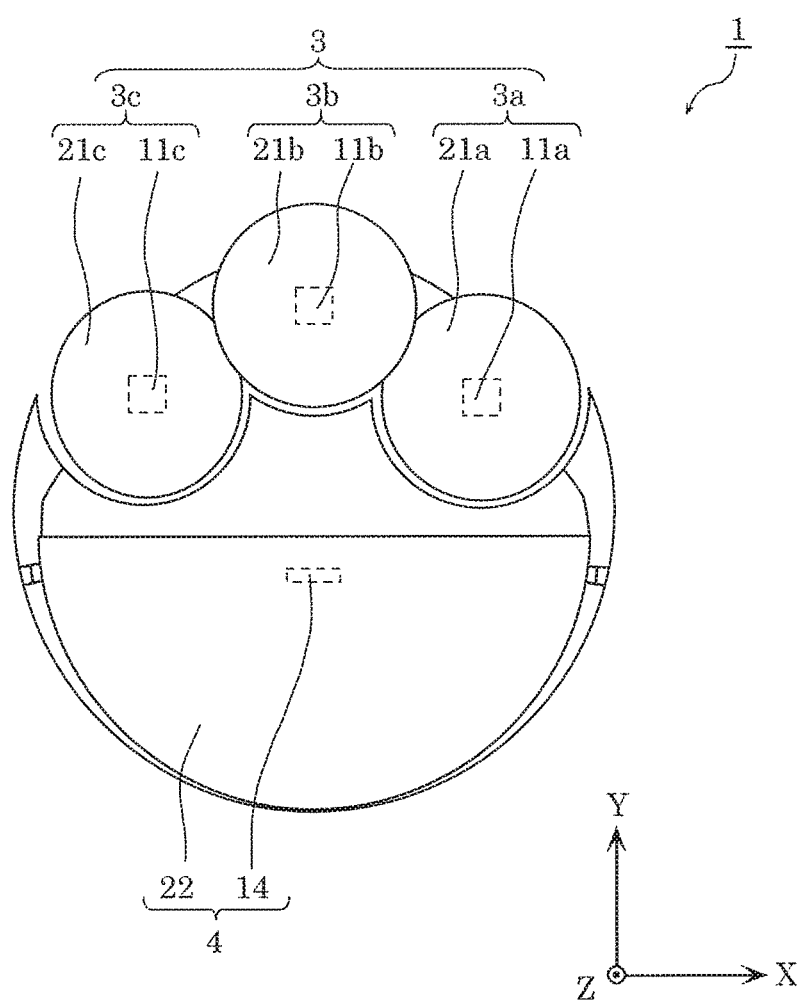
FIG. 3 is a front view of a lighting apparatus according to an embodiment of the present disclosure.
Figure 4:
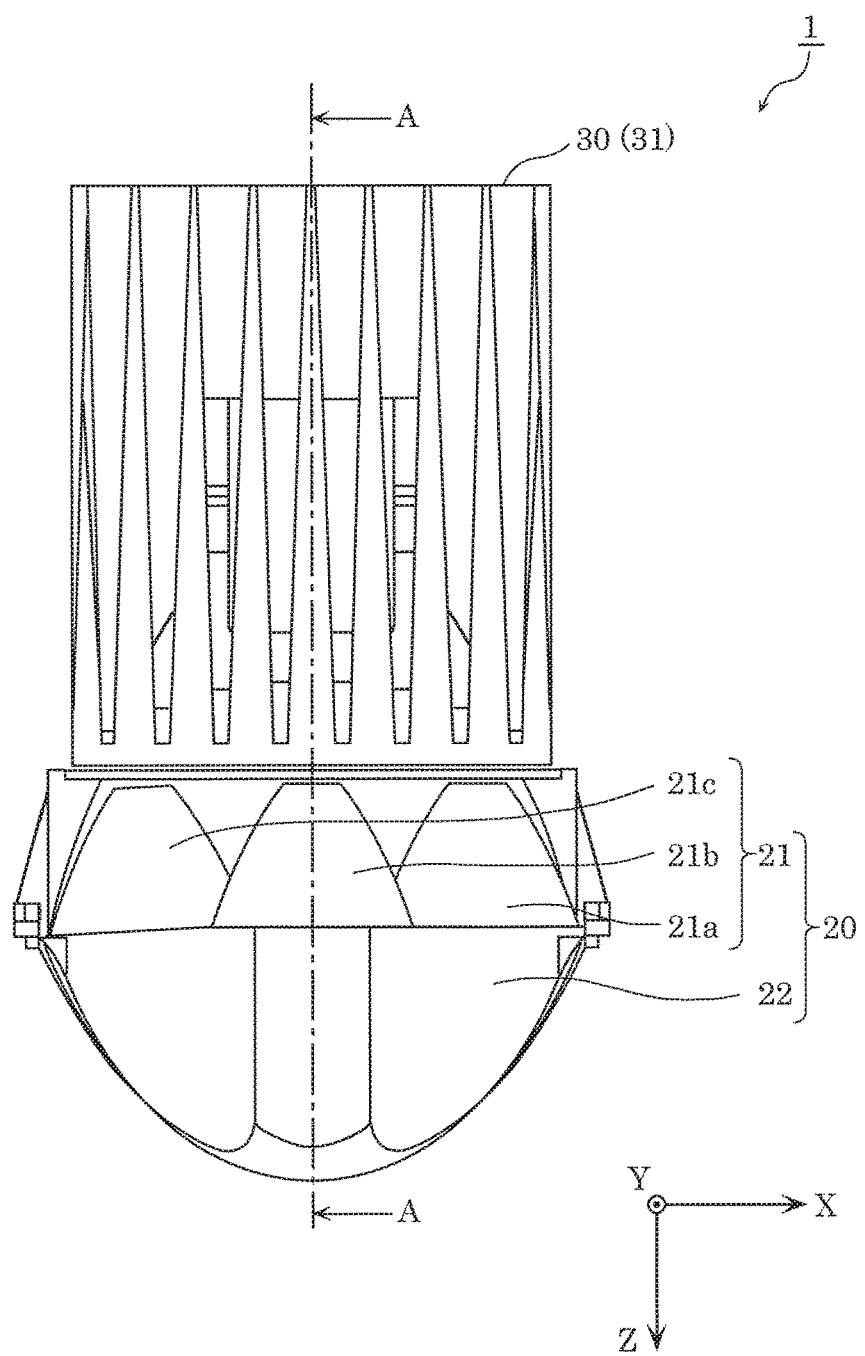
FIG. 4 is a top view of a lighting apparatus according to an embodiment of the present disclosure.
Figure 5:
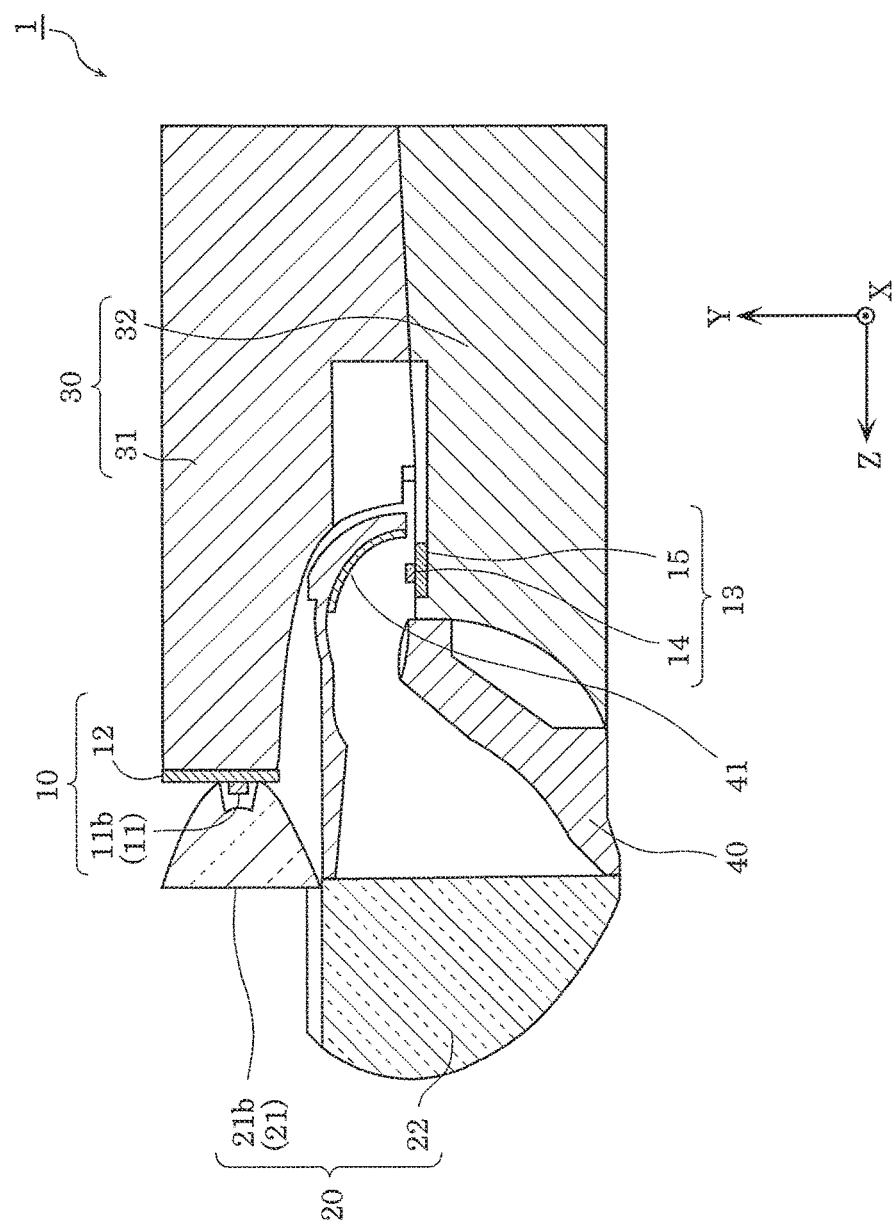
FIG. 5 is a cross sectional view of a lighting apparatus according to an embodiment of the present disclosure taken at line A-A in FIG. 4.
Figure 6:
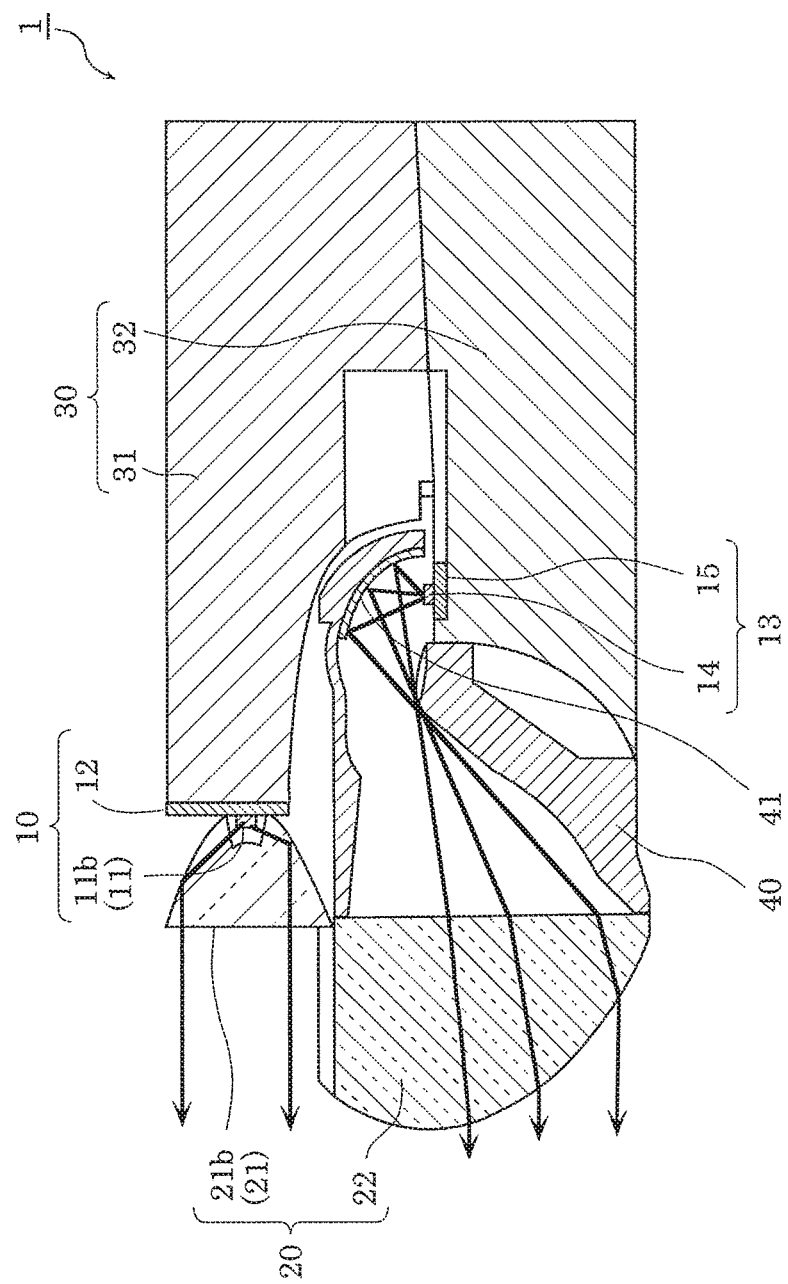
FIG. 6 is a cross sectional view of a lighting apparatus according to an embodiment of the present disclosure taken at line A-A in FIG. 4, illustrating paths of light emitted when the high beams and low beams are in use.

Next, lighting apparatus 1 according to the embodiment will be described with reference to FIG. 2 through FIG. 6. FIG. 2 is a perspective view of the lighting apparatus according to the embodiment. FIG. 3 is a front view of the lighting apparatus. FIG. 4 is a plan view of the lighting apparatus. FIG. 5 is a cross sectional view of the lighting apparatus taken at line A-A in FIG. 4. FIG. 6 is a cross sectional view of the lighting apparatus taken at line A-A in FIG. 4, and illustrates light paths of the light emitted when the high beam and the low beam are used.

Lighting apparatus 1 according to the embodiment is a vehicle lighting apparatus used in, for example, a vehicle headlight, and projects light forward. As illustrated in FIG. 2 through FIG. 5, the main body of lighting apparatus 1 includes base 2, high beam lamp 3, and low beam lamp 4. More specifically, lighting apparatus 1 includes high beam light source module 10, low beam light source module 13, lens body 20, heat sink 30, and shield 40. Lighting apparatus 1 further includes a lighting controller (not shown in FIG. 2 through FIG. 5) that controls high beam light source module 10 and low beam light source module 13.

As illustrated in FIG. 5, high beam light source module 10 includes high beam light emitting device (first light emitting device) 11 and substrate 12 for high beam use. Low beam light source module 13 includes low beam light emitting device (second light emitting device) 14 and substrate 15 for low beam use.

As illustrated in FIG. 5, lens body 20 is disposed in front of high beam light source module 10 (high beam light emitting device 11) and low beam light source module 13 (low beam light emitting device 14). As illustrated in FIG. 4, lens body 20 includes high beam lens unit 21 and low beam lens unit 22. High beam lens unit 21 is configured of three collimating lenses—first collimating lens 21a, first collimating lens 21b, and second collimating lens 21c.

As illustrated in FIG. 5, heat sink 30 is configured of two heat dissipating components—first heat sink 31 thermally coupled to high beam light emitting device 11 and second heat sink 32 thermally coupled to low beam light emitting device 14.

In the embodiment, heat sink 30 and shield 40 together form base 2, and high beam light source module 10 and low beam light source module 13 are disposed on base 2. In other words, high beam light emitting device 11 and low beam light emitting device 14 are disposed on base 2.

As illustrated in FIG. 3, high beam light source module 10 and high beam lens unit 21 together form high beam lamp 3. High beam lamp 3 is an optical system for producing a high beam having a desired light distribution pattern. More specifically, high beam lamp 3 includes first high beam lamp 3a, first high beam lamp 3b, and second high beam lamp 3c.

As illustrated in FIG. 3, low beam light source module 13 and low beam lens unit 22 together form low beam lamp 4. Low beam lamp 4 is an optical system for producing a low beam having a desired light distribution pattern.

Note that high beam lamp 3 and low beam lamp 4 may include other optical components. High beam lamp 3 and low beam lamp 4 will be described in further detail later.

As illustrated in FIG. 3 and FIG. 4, high beam light source module 10, low beam light source module 13, lens body 20, heat sink 30, and shield 40 are arranged so as to fit in a given circular region when viewed along the Z axis, and in the embodiment, are arranged so as to fit in a φ70 mm region.

Hereinafter, each structural element will be described in detail.

Light Source Modules

High beam light source module 10 is an LED module for producing the high beam, and is used to illuminate an area a far distance ahead. Low beam light source module 13 is an LED module for producing the low beam, and is used to illuminate the road immediately ahead.

A plurality of high beam light emitting devices 11 (first high beam light emitting device 11a, first high beam light emitting device 11b, and second high beam light emitting device 11c) are mounted on substrate 12 in high beam light source module 10. In the embodiment, first high beam light emitting device 11a, first high beam light emitting device 11b, and second high beam light emitting device 11c are mounted so as to correspond to first collimating lens 21a, first collimating lens 21b, and second collimating lens 21c, respectively. More specifically, high beam light emitting device 11 emits light that transmits through high beam lens unit 21. For example, high beam light emitting device 11 emits light when lighting apparatus 1 projects the high beam.

Low beam light emitting device 14 is mounted on substrate 15 in low beam light source module 13. More specifically, low beam light emitting device 14 emits light, that transmits through low beam lens unit 22. For example, low beam light emitting device 14 emits light not only when lighting apparatus 1 projects the low beam, but when the high beam is projected as well.

High beam light source module 10 and low beam light source module 13 are, for example, white light sources, such as B-Y white LED light sources that use a blue LED chip and a yellow phosphor to emit white light. Alternatively, high beam light source module 10 and low beam light source module 13 may be white LED light sources that use an LED chip that emits red light, an LED chip that emits green light, and an LED chip that emits blue light to collectively emit white light.

Moreover, high beam light source module 10 and low beam light source module 13 may be surface mount device (SMD) modules, and alternatively may be chip on board (COB) modules.

When high beam light source module 10 and low beam light source module 13 are SMD modules, high beam light emitting device 11 and low beam light emitting device 14 are each an SMD LED device that has an LED chip (bare chip) mounted and sealed with a sealant (phosphor-containing resin) in a resin package. When high beam light source module 10 and low beam light source module 13 are COB modules, high beam light emitting device 11 and low beam light emitting device 14 are each LED chips themselves, and are directly mounted on substrate 12 and substrate 15, respectively. In this case, the LED chips mounted on substrate 12 and substrate 15 are sealed with a sealant such as a phosphor-containing resin.

Substrate 12 and substrate 15 are, for example, ceramic substrates made of, for example, alumina, resin substrates made of resin, or insulated metal substrates consisting of a metal baseplate covered by a layer of insulating material. Substrate 12 and substrate 15 have a shape in plan view corresponding to the shape of the mounting surface on heat sink 30 to which substrate 12 and substrate 15 are mounted.

High beam light source module 10 having such as structure is fixed to first heat sink 31 of heat sink 30. More specifically, substrate 12 is mounted and fixed to a predetermined mounting surface on first heat sink 31. Moreover, in the embodiment, substrate 12 is arranged standing (i.e., vertically) so that high beam light source module 10 projects light in a forward direction. In other words, the optical axis of high beam light source module 10 (high beam light emitting device 11) is parallel to the Z axis.

Low beam light source module 13 is fixed to second heat sink 32 of heat sink 30. More specifically, substrate 15 is mounted and fixed to a predetermined mounting surface on second heat sink 32. Moreover, in the embodiment, substrate 15 is arranged laying flat (i.e., horizontally) so that low beam light source module 13 projects light in an upward direction. In other words, the optical axis of low beam light source module 13 (low beam light emitting device 14) is parallel to the Y axis.

Lens Body

As illustrated in FIG. 2 through FIG. 5, high beam lens unit 21 and low beam lens unit 22 are integrally formed together to form lens body 20. For example, lens body 20 can be made by, for example, injection molding using a clear resin such as acryl, polycarbonate, or cyclic olefin. Note that high beam lens unit 21 and low beam lens unit 22 are not required to be integrally formed.

As described above, high beam lens unit 21 is disposed in front of high beam light source module 10 and configured of three collimating lenses—first collimating lens 21a, first collimating lens 21b, and second collimating lens 21c.

As illustrated in FIG. 6, light emitted forward by first high beam light emitting device 11a, first high beam light emitting device 11b, and second high beam light emitting device 11c passes through first collimating lens 21a, first collimating lens 21b, and second collimating lens 21c and travels forward as collimated light.

More specifically, first collimating lens 21a, first collimating lens 21b, and second collimating lens 21c each have a truncated cone shape whose diameter increases toward the front. The plurality of high beam light emitting devices 11 (first high beam light emitting device 11a, first high beam light emitting device 11b, and second high beam light emitting device 11c) are disposed in the smaller diameter regions of these truncated cones (i.e., toward the back).

With this configuration, light emitted by first high beam light emitting device 11a, first high beam light emitting device 11b, and second high beam light emitting device 11c is collimated by totally reflecting off the inner face of the truncated conical and curved outer wall. The collimated light then exits the front surface (planar surface) of first collimating lens 21a, first collimating lens 21b, and second collimating lens 21c, and travels forward.

Low beam lens unit 22 is disposed in front of low beam light source module 13. Low beam lens unit 22 is also disposed in front of shield 40. More specifically, low beam lens unit 22 is disposed so as to cover an opening formed in front of shield 40.

The lower portion of low beam lens unit 22 has the shape of a quarter slice of a sphere (one quarter of a sphere). The upper portion of low beam lens unit 22 has the shape of one quarter of a sphere, but the portions in front of the three lenses included in high beam lens unit 21 are removed.

As illustrated in FIG. 6, light emitted upward by low beam light emitting device 14 is reflected off reflector 41 of shield 40 and enters low beam lens unit 22. The optical properties of low beam lens unit 22 direct the light, and the light exits forward from the front surface (curved surface) of low beam lens unit 22.

Heat Sink

Heat sink 30 is a heat dissipating component for dissipating heat generated by high beam light source module 10 and low beam light source module 13 (to the atmosphere). Consequently, heat sink 30 is preferably made of a material with a high rate of heat transfer, such as metal. Heat sink 30 is, for example, an aluminum die cast heat sink made from composite aluminum.

As illustrated in FIG. 5, heat sink 30 is divided into first heat sink 31 and second heat sink 32. In other words, first heat sink 31 and second heat sink 32 are integrally combined to form heat sink 30. First heat sink 31 and second heat sink 32 each include a plurality of heat dissipating fins.

First heat sink 31 is a heat dissipating component for dissipating heat generated mainly by high beam light source module 10 (high beam light emitting device 11). First heat sink 31 includes a mounting surface (installation surface) for mounting high beam light source module 10.

Second heat sink 32 is a heat dissipating component for dissipating heat generated mainly by low beam light source module 13 (low beam light emitting device 14). Second heat sink 32 includes a mounting surface (installation surface) for mounting low beam light source module 13.

In the embodiment, the front end of first heat sink 31 protrudes further forward than the front end of second heat sink 32. This allows high beam light source module 10 to be disposed further forward than low beam light source module 13.

Shield

Shield 40 is for defining a predetermined cut-off line. Shield 40 defines the predetermined cut-off line by shielding a portion of the light emitted by low beam light source module 13. As illustrated in FIG. 5, shield 40 is disposed in the space between low beam lens unit 22 and heat sink 30.

Shield 40 may be formed by plastics molding using heat resistant resin, for example. Note that shield 40 may be metal instead of resin.

As illustrated in FIG. 5, in the embodiment, reflector 41 is formed on shield 40. Reflector 41 is disposed above low beam light source module 13 and reflects light emitted upward by low beam light source module 13. Reflector 41 has a curved reflective surface so as to reflect light forward at a downward sloping angle toward low beam lens unit 22. Reflector 41 is formed by giving a portion of shield 40 a mirror finish. For example, reflector 41 may be formed on shield 40 by forming a metal deposition film (for example, an aluminum deposition film) on a portion of shield 40 (heat resistant resin).

Note that reflector 41 and shield 40 may be separate components instead of being formed integrally.

Area of Illumination

Next, the area illuminated by lighting apparatus 1 according to the embodiment will be described with reference to FIG. 7 through FIG. 11.

Figure 7:
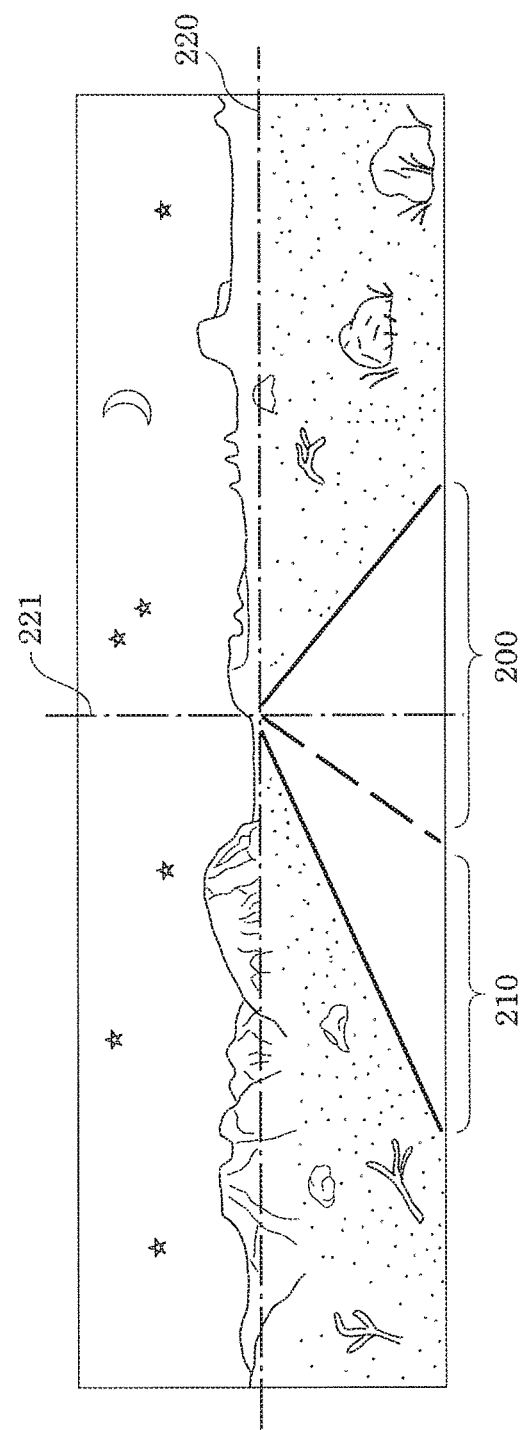
FIG. 7 illustrates a driving lane for an automobile according to an embodiment of the present disclosure and an oncoming traffic lane.

FIG. 7 illustrates the driving lane for the automobile according to the embodiment and the oncoming traffic lane.

As described above, lighting apparatus 1 according to the embodiment is used in the headlights of automobile 100. Automobile 100 is driven, for example, in driving lane 200 illustrated in FIG. 7. For example, FIG. 7 illustrates a view forward from the driver's seat of automobile 100.

In the embodiment, the lane to the right relative to the direction of travel of automobile 100 is driving lane 200 for automobile 100, and the lane to the left, relative to the direction of travel of automobile 100 is oncoming traffic lane 210 (i.e., right-hand traffic), as illustrated in FIG. 7. Note that the left lane relative to the direction of travel of automobile 100 may be the driving lane for automobile 100 and the right lane relative to the direction of travel may be the oncoming traffic lane (i.e., left-hand traffic). In the case of left-hand traffic, the area illuminated by (the light distribution pattern of) the high beam and the low beam in the case of right-hand traffic may simply be laterally mirrored.

Note that in FIG. 7, the optical axis of lighting apparatus 1 (the headlight) is shown by the intersection of horizontal line 220 and vertical line 221. The height (vertical position) of horizontal line 220 is, for example, the height of lighting apparatus 1 measured from the ground. The position (horizontal position) of vertical line 221 is, for example, approximately in front (in the driving direction) of vehicle body 110. In other words, vertical line 221 is equivalent to a vertical plane passing through the optical axis of lighting apparatus 1.

Figure 8:
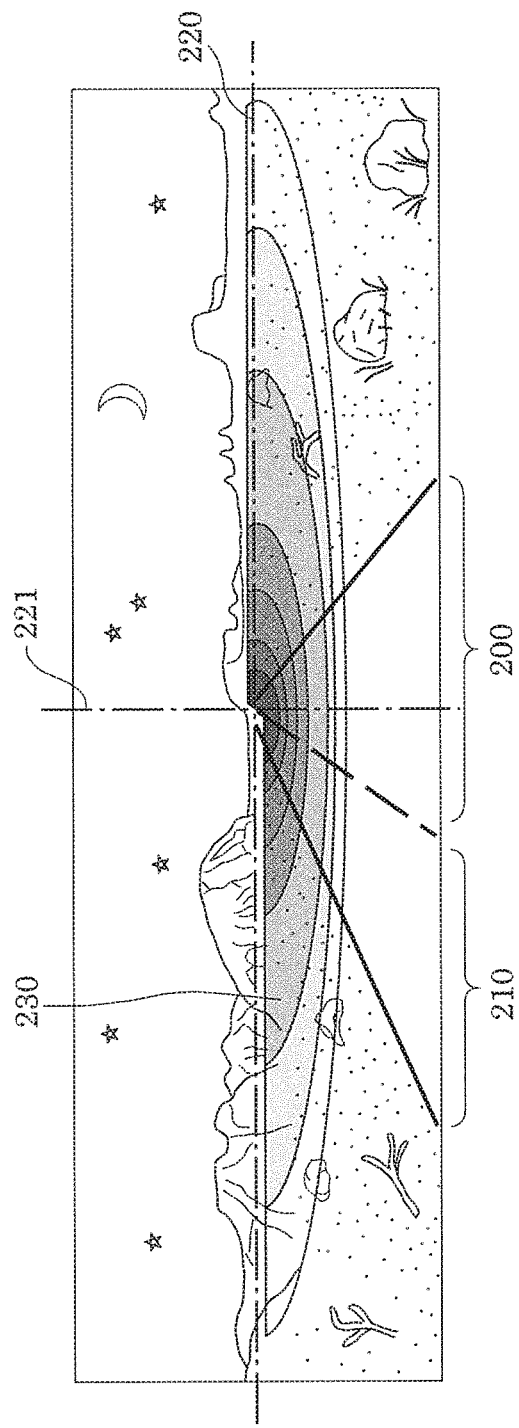
FIG. 8 illustrates an area illuminated by a lighting apparatus according to an embodiment of the present disclosure when the low beams are in use.

FIG. 8 illustrates the area illuminated by lighting apparatus 1 according to the embodiment when the low beams are in use.

Low beam area of illumination 230 illustrated in FIG. 8 is a light distribution pattern formed with lighting apparatus 1 when the low beams are in use. In other words, low beam area of illumination 230 is the area lighting apparatus 1 illuminates when the low beams are in use. Low beam area of illumination 230 is formed so as to achieve a luminous intensity at a point of measurement based on a given standard. Note that the luminous intensity of low beam area of illumination 230 is high in the vicinity of the center and gradually decreases with distance outward in FIG. 8.

More specifically, when the low beams are in use, lighting apparatus 1 illuminates the vicinity in front of automobile 100. For example, lighting apparatus 1 illuminates the side of the road in oncoming traffic lane 210 in addition to the side of the road in driving lane 200. Moreover, lighting apparatus 1 illuminates the portion of driving lane 200 far ahead that is above horizontal line 220.

Here, lighting apparatus 1 increases the luminous intensity of driving lane 200 while reducing the luminous intensity of oncoming traffic lane 210. To achieve this, low beam area of illumination 230 includes what is known as a cut-off line. More specifically, the cut-off line is what produces the uneven top line of low beam area of illumination 230.

In this way, when the low beams are being used, lighting apparatus 1 illuminates the area of driving lane 200 far ahead above horizontal line 220 in addition to the immediately surrounding area. This makes it possible to provide the driver with a more pleasant driving experience. On the other hand, the area above horizontal line 220 on the side of oncoming traffic lane 210 is not illuminated, which makes it possible to avoid unintentionally blinding oncoming drivers.

Figure 9:
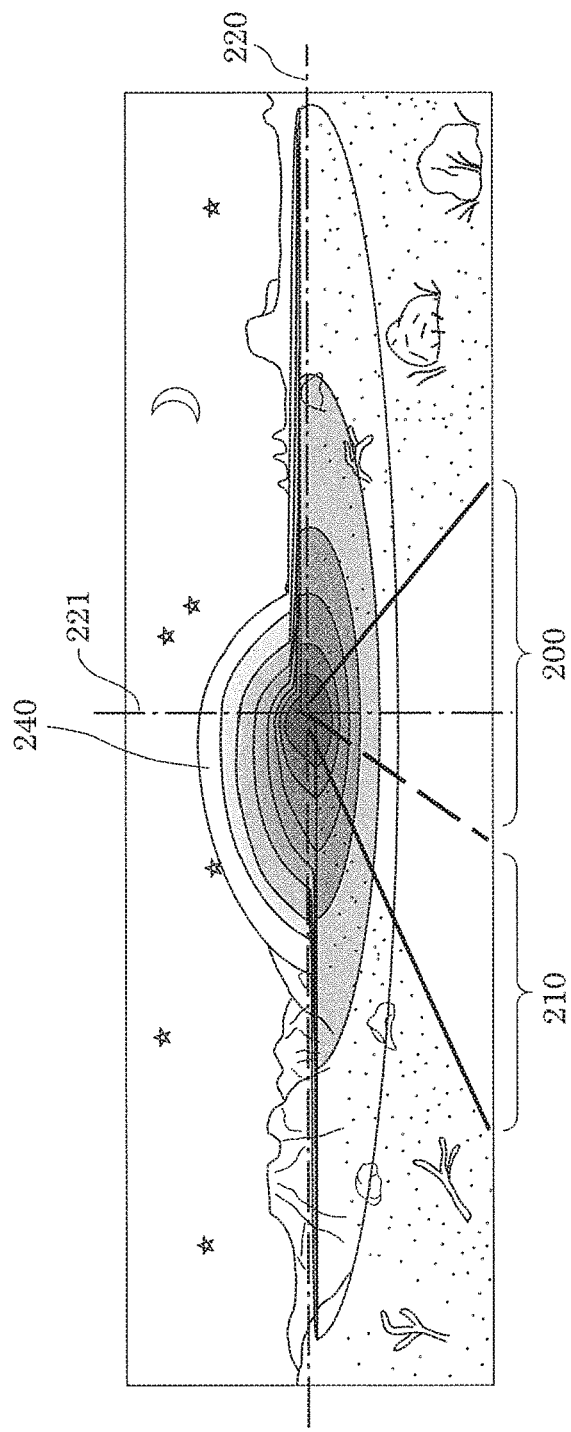
FIG. 9 illustrates an area illuminated by a lighting apparatus according to an embodiment of the present disclosure when the high beams are in use.

FIG. 9 illustrates the area illuminated by lighting apparatus according to the embodiment when the high beams are in use.

High beam area of illumination 240 illustrated in FIG. 9 is a light distribution pattern formed with lighting apparatus 1 when the high beams are in use. In other words, high beam area of illumination 240 is the area lighting apparatus 1 illuminates when the high beams are in use. High beam area of illumination 240 is formed so as to achieve a luminous intensity at a point of measurement based on a given standard.

When the high beams are in use, regions above horizontal line 220 on both driving lane 200 and oncoming traffic lane 210 sides of the road are illuminated. This makes it possible for the driver to more clearly see objects in the far field including oncoming traffic lane 210 in addition to driving lane 200, and thus provide the driver with a more pleasant driving experience.

High beam area of illumination 240 illustrated in FIG. 9 is formed by overlapping three areas of illumination. More specifically, the three areas of illumination are low beam area of illumination 230 illustrated in FIG. 8, first high beam area of illumination 241 illustrated in FIG. 10, and second high beam area of illumination 242 illustrated in FIG. 11.

Figure 10:
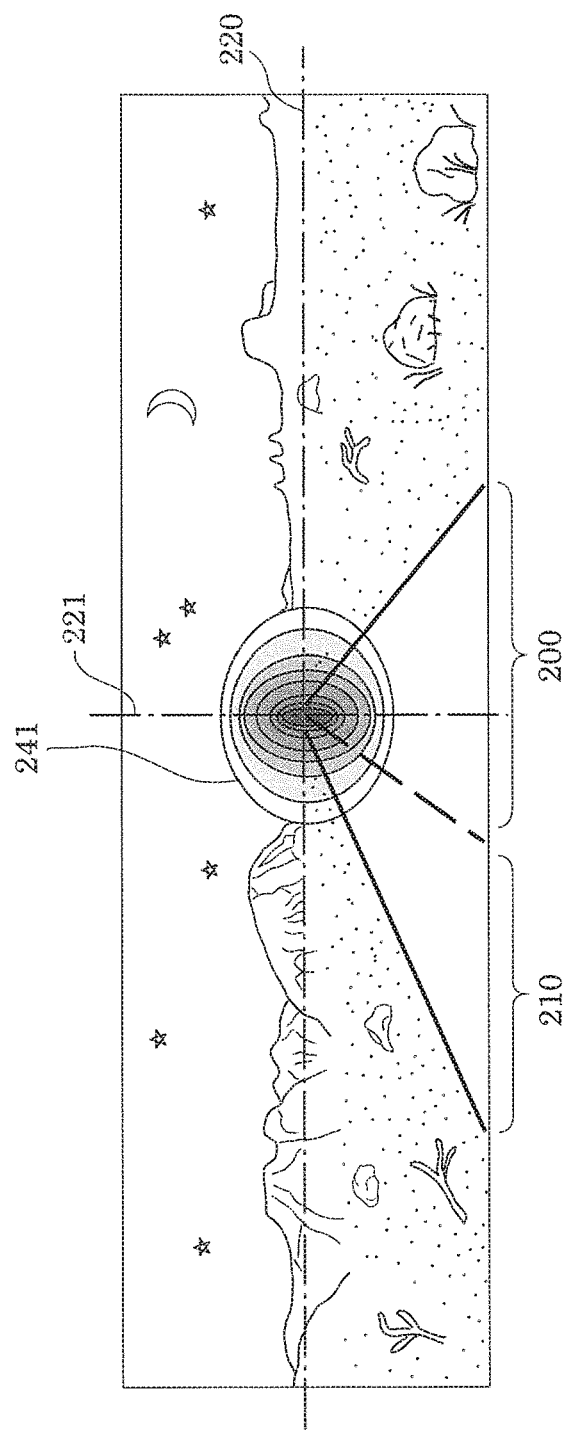
FIG. 10 illustrates an area illuminated by a first high beam lamp included in a lighting apparatus according to an embodiment of the present disclosure.
Figure 11:
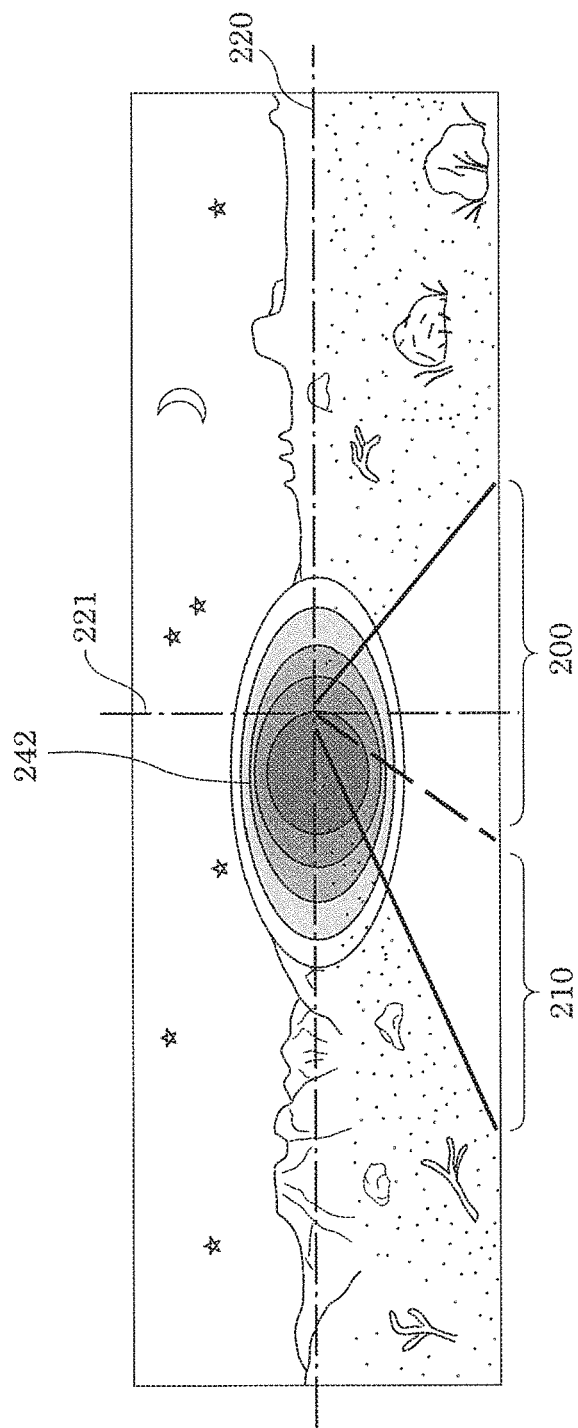
FIG. 11 illustrates an area illuminated by a second high beam lamp included in a lighting apparatus according to an embodiment of the present disclosure.

Note that FIG. 10 illustrates the area illuminated by first high beam lamp 3a and first high beam lamp 3b included in lighting apparatus 1 according to the embodiment, FIG. 11 illustrates the area illuminated by second high beam lamp 3c included in lighting apparatus 1 according to the embodiment.

Hereinafter, high beam lamp 3, first high beam area of illumination 241, and second high beam area of illumination 242 will be described with reference to FIG. 10 and FIG. 11 while also referring back to FIG. 2 through FIG. 5.

First High Beam Lamp

First high beam lamp 3a includes first high beam light emitting device 11a and first collimating lens 21a, as illustrated in FIG. 3. Similarly, first high beam lamp 3b includes first high beam light emitting device 11b and first collimating 21b, as illustrated in FIG. 3.

First collimating lens 21a and first collimating lens 21b are substantially circular in front view, as illustrated in FIG. 3. First collimating lens 21a and first collimating lens 21b are designed so as to have optical axes that align with the traveling direction of automobile 100 (Z axis) when lighting apparatus 1 is attached to automobile 100.

The area illuminated by first high beam lamp 3a and first high beam lamp 3b is first high beam area of illumination 241 illustrated in FIG. 10. Note that first high beam lamp 3a and first high beam lamp 3b illuminate approximately the same area. In other words, first high beam lamp 3a and first high beam lamp 3b both illuminate first high beam area of illumination 241.

The center of the area illuminated by first high beam lamp 3a is, for example, the centroid of the area, and the center of the area illuminated by first high beam lamp 3b is, for example, the centroid of the area. More specifically, the center of the area illuminated by first high beam lamp 3a and first high beam lamp 3b is the center (centroid) of first high beam area of illumination 241.

For example, the center of first high beam area of illumination 241 is located in the vicinity of where driving lane 200 and horizontal line 220 intersect in the distance, as illustrated in FIG. 10. For example, the center of first high beam area of illumination 241 is located at the intersection of horizontal line 220 and vertical line 221.

Second High Beam Lamp

Second high beam lamp 3c includes second high beam light emitting device 11c and second collimating lens 21c, as illustrated in FIG. 3. The area illuminated by second high beam lamp 3c is second high beam area of illumination 242 illustrated in FIG. 11. As can be seen by comparing FIG. 10 and FIG. 11, first high beam area of illumination 241 and second high beam area of illumination 242 are different from each other.

More specifically, the optical axis of second collimating lens 21c is oblique to the optical axes of first collimating lens 21a and first collimating lens 21b, as illustrated in FIG. 4. For example, the optical axis of second collimating lens 21c intersects the optical axis of first collimating lens 21a at an angle greater than 0 degrees and less than or equal to 10 degrees. In other words, second collimating lens 21c is oriented at an angle such that its optical axis points toward oncoming traffic lane 210.

This makes it possible to horizontally space apart the center of the area illuminated by second high beam lamp 3c and the center of the area illuminated by first high beam lamp 3a and first high beam lamp 3b. In other words, as can be seen by comparing FIG. 10 and FIG. 11, the center of second high beam area of illumination 242 and the center of first high beam area of illumination 241 are horizontally spaced apart from each other.

More specifically, the center of second high beam area of illumination 242 is situated around horizontal line 220 to the side of oncoming traffic lane 210 (the side away from driving lane 200). In other words, the center of second high beam area of illumination 242 is located a given distance away from the intersection of vertical line 221 and horizontal line 220 in a direction toward oncoming traffic lane 210.

Second collimating lens 21c is substantially elliptical in front view. In other words, second collimating lens 21c has a different shape than first collimating lens 21a. More specifically, the shape of the reflective surface the side surface) of second collimating lens 21c is designed to be different than the shape of first collimating lens 21a.

Note that, as illustrated in FIG. 3, first collimating lens 21a and second collimating lens 21c are substantially circular in front view, but first collimating lens 21a is closer to a true circle than second collimating lens 21c.

As a result, second high beam area of illumination 242 has a horizontal width that is greater than the horizontal width of first high beam area of illumination 241. More specifically, second high beans area of illumination 242 has a maximum horizontal width that is greater than the maximum horizontal width of first high beam area of illumination 241. As illustrated in FIG. 10 and FIG. 11, second high beam area of illumination 242 is substantially elliptical, while first high beam area of illumination 241 is substantially circular.

Note that, for example, first high beam area of illumination 241 may be included in second high beam area of illumination 242. In other words, second high beam area of illumination 242 may be larger than first high beam area of illumination 241. Moreover, first high beam area of illumination 241 may have a vertical width. (i.e., height) that is greater than the height of second high beam area of illumination 242.

High Beam Lamp Arrangement

As illustrated in FIG. 3 and FIG. 4, first high beam lamp 3a and first high beam lamp 3b are horizontally offset from each other. Moreover, as illustrated in FIG. 3, first high beam lamp 3a and first high beam lamp 3b are vertically offset from each other.

More specifically, first high beam light emitting device 11a and first high beam light emitting device 11b are spaced apart from each other both horizontally and vertically. First collimating lens 21a and first collimating lens 21b are also offset from each other both horizontally and vertically.

This allows for the horizontal width of the space occupied by first high beam lamp 3a and first high beam lamp 3b to be reduced to less than when aligned on a single horizontal line. This makes it possible to reduce the overall size of lighting apparatus 1.

First high beam lamp 3b and second high beam lamp 3c are also offset from each other both horizontally and vertically. More specifically, first high beam light emitting device 11b and second high beam light emitting device 11c are spaced apart from each other both horizontally and vertically. First collimating lens 21b and second collimating lens 21c are also offset from each other both horizontally and vertically.

This makes it possible to reduce the overall size of lighting apparatus 1.

Note that when viewed from the front, first high beam lamp 3a, first high beam lamp 3b, and second high beam lamp 3c are disposed in the listed order from right to left. In other words, second high beam lamp 3c is disposed on the side opposite oncoming traffic lane 210, but the arrangement of the high beam lamp is not limited to this example. Second high beam lamp 3c may be disposed in the middle position and, alternatively, may be disposed on the side nearest oncoming traffic lane 210.

Moreover, the number of first high beam lamps included in lighting apparatus 1 may be one, and the number of second high beam lamps included in lighting apparatus 1 may be more than one.

On/Off Control

Figure 12:
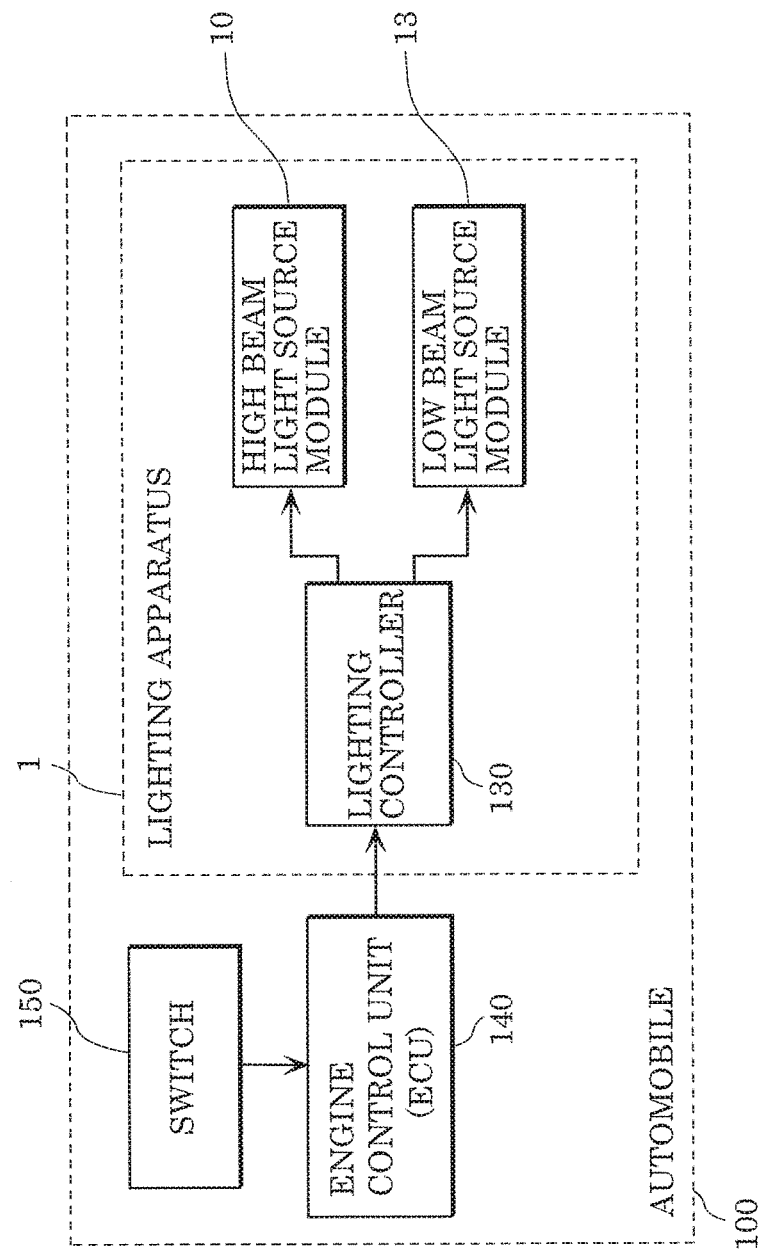
FIG. 12 is a block diagram illustrating a configuration relating to lighting functions of an automobile according to an embodiment of the present disclosure.

FIG. 12 is a block diagram illustrating a configuration relating to lighting functions of automobile 100 according to the embodiment. In other words, FIG. 12 is an illustration of when lighting apparatus 1 according to the embodiment is installed in automobile 100.

As illustrated in FIG. 12, automobile 100 includes lighting apparatus 1, engine control unit 140, and switch 150. Lighting apparatus 1 includes a main body (high beam light source module 10 and low beam light source module 13) and lighting controller 130.

Lighting controller 130 turns on first high beam light emitting device 11a, first high beam light emitting device 11b, second high beam light emitting device 11c, and low beam light emitting device 14 when the high beams are turned on. In other words, lighting controller 130 turns on all light emitting devices when the high beams are turned on.

When the low beams are turned on, however, lighting controller 130 only turns on low beam light emitting device 14.

Engine control unit (ECU) 140 controls the engine of automobile 100. Engine control unit 140 is, for example, a microcontroller. Lighting controller 130 and switch 150 are connected to engine control unit 140. Engine control unit 140 transmits an instruction input from switch 150 to lighting controller 130.

Switch 150 switches lighting apparatus 1 on and off. More specifically, switch 150 switches the low beams on and off and switches the high beams on and off. Even more specifically, switch 150 switches each of low beam light emitting device 14, first high beam light emitting device 11a, first high beam light emitting device 11b, and second high beam light emitting device 11c on and off.

For example, when driving at night and an oncoming vehicle is present, the driver of automobile 100 operates switch 150 to cause lighting apparatus 1 to project the low beam. More specifically, lighting controller 130 turns on only low beam light emitting device 14 to achieve low beam area of illumination 230 illustrated in FIG. 8.

Moreover, when driving at night and an oncoming vehicle is not present, the driver of automobile 100 operates switch 150 to cause lighting apparatus 1 to project the high beam. More specifically, lighting controller 130 turns on low beam light emitting device 14, first high beam light emitting device 11a, first high beam light emitting device 11b, and second high beam light emitting device 11c to achieve high beam area of illumination 240 illustrated in FIG. 9.

Summary

With a conventional lighting apparatus, for example, when driving at night and an oncoming vehicle is present, the low beam light emitting device is turned on, and when driving at night and an oncoming vehicle is not present, the high beam light emitting device is turned on. In other words, either the low beam light emitting device or the high beam light emitting device is exclusively turned on depending on the presence of an oncoming vehicle.

In this case, the high beam light emitting device must achieve an extremely high illuminance, which makes it impossible to reduce power consumption.

For example, when the area that is illuminated for high beam use is achieved with one light emitting device or a plurality of light emitting devices that illuminate the same area, the luminous intensity must be increased excessively. For example, when the light emitting device is turned on so as to achieve a luminous intensity at a measurement point A stipulated in a given standard, the luminous intensity at a different measurement point B may be enough to fulfill the luminous intensity required by the standard. In other words, it is possible to fulfill the luminous intensity required by the standard even if the luminous intensity at measurement point B is reduced. In other words, projecting light of an excessive luminous intensity at measurement point B is an inefficient use of power.

In light of this, according to the embodiment, lighting apparatus 1 is a lighting apparatus for vehicle use that projects light forward, and includes: base 2, low beam lamp 4 including low beam light emitting device 14 disposed on base 4; first high beam lamp 3a including first high beam light emitting device 11a disposed on base 4; second high beam lamp 3c including second high beam light emitting device 11c disposed on base 4; and lighting controller 130 configured to turn on low beam light emitting device 14, first high beam light emitting device 11a, and second high beam light emitting device 11c when high beams are turned on.

The center of an area illuminated by first high beam lamp 3a and the center of an area illuminated by second high beam lamp 3c are horizontally spaced apart from each other.

Accordingly, power consumption can be reduced.

The center of the area illuminated by first high beam lamp 3a and the center of the area illuminated by second high beam lamp 3c are horizontally spaced apart, from each other. In other words, first high beam lamp 3a and second high beam lamp 3c illuminate different, overlapping areas such that one area supplements the other. For example, by having one of first high beam lamp 3a and second high beam lamp 3c illuminate a region including measurement point A and the other of first high beam lamp 3a and second high beam lamp 3c illuminate a region including measurement point B, first high beam lamp 3a and second high beam lamp 3c can achieve a luminous intensity necessary for each area. This makes it possible to reduce wasteful consumption of power and thus reduce power consumption while maintaining luminous intensity. In other words, compared to the example where the area of illumination is formed by either exclusively turning on the low beam light emitting device or exclusively turning on the high beam light emitting device, the amount of luminance produced by each lighting element and the amount of power consumed is reduced.

Moreover, for example, the horizontal width of the area illuminated by second high beam lamp 3c is greater than the horizontal width of the area illuminated by first high beam lamp 3a.

For example, as illustrated in FIG. 10, since first high beam lamp 3a and first high beam lamp 3b illuminate a narrow area of an extension of driving lane 200, power consumption is reduced by reducing the amount of light output while still being able to illuminate the near portion of driving lane 200 to a sufficient brightness.

Moreover, as illustrated in FIG. 11, since second high beam lamp 3c illuminates a horizontally elongated area (a narrow area) including driving lane 200 and oncoming traffic lane 210, it is still possible to illuminate the shoulder of the road adjacent to driving lane 200 as well as the area next to the shoulder, and the shoulder of the road adjacent to oncoming traffic lane 210 as well as the area next to the shoulder, to a sufficient brightness, even though power consumption is reduced by reducing the amount of light output.

Additionally, as illustrated in FIG. 9, low beam lamp 4 illuminates an area in front of and immediately surrounding automobile 100 that is horizontally wide (low beam area of illumination 230). With this, each of the areas can be sufficiently illuminated when the high beams are in use.

Here, since first high beam lamp 3a, first high beam lamp 3b, second high beam lamp 3c, and low beam lamp 4 each illuminate a narrow area, power consumption is reduced.

Moreover, for example, first high beam lamp 3a includes first collimating lens 21a, second high beam lamp 3c includes second collimating lens 21c, and the optical axis of second collimating lens 21c is oblique to the optical axis of first collimating lens 21a.

With this, second high beam lamp 3c can be achieved with a simple structure, since angling the optical axis of the lens is all that is required.

Moreover, for example, first collimating lens 21a is substantially circular in front view and second collimating lens 21c is substantially elliptical in front view.

With this, first high beam lamp 3a, first high beam lamp 3b, and second high beam lamp 3c can be achieved with a simple structure, since shaping the respective lenses differently is all that is required.

Moreover, for example, lighting apparatus 1 includes a plurality of first high beam lamps—first high beam lamp 3a and first high beam lamp 3b—that are horizontally offset from each other.

This makes it possible to reduce the overall size of lighting apparatus 1.

Moreover, for example, first high beam lamp 3a and first high beam lamp 3b are vertically offset from each other.

This makes it possible to reduce the overall size of lighting apparatus 1.

Moreover, for example, first high beam lamp 3a, first high beam lamp 3b, and second high beam lamp 3c are vertically offset from each other.

This makes it possible to reduce the overall size of lighting apparatus 1.

Moreover, for example, the automobile according to the embodiment includes lighting apparatus 1, vehicle body 110 including lighting apparatus 1 in a front portion, and engine control unit 140 connected to lighting controller 130.

This makes it possible to improve fuel efficiency and, for example, extend the distance capable of being driven, by reducing power consumption.

Variations

Although the lighting apparatus, automobile, etc., according to the present disclosure are described based on an embodiment, the present disclosure is not limited to this embodiment.

For example, in the above embodiment, second collimating lens 21c is exemplified as having a truncated conical shape and being disposed at an angle; but second collimating lens 21c is not limited to this example. For example, second collimating lens 21c may have the shape of a truncated cone that is sliced at an angled. In other words, the front surface (surface from which light exits) of the truncated cone may be angled with respect to the axis of the truncated cone.

Moreover, for example, the optical axis may be angled by treating the surface of the collimating lens. More specifically, a microlens may be formed in the front surface of the collimating lens to change the direction of travel of light. In this case, the surface of the collimating lens in the vicinity of the peripheral edge of the lens in particular may be untreated. This increases the ability of the collimating lens to collect light even further.

Moreover, for example, in the above embodiment, second high beam area of illumination 242 is exemplified as having a horizontal width that is greater than the horizontal width of first high beam area of illumination 241, but this example is not limiting. For example, first high beam area of illumination 241 may have a horizontal width that is greater than the horizontal width of second high beam area of illumination 242. More specifically, second collimating lens 21c may have a shape that is closer to a true circle than first collimating lens 21a and first collimating lens 21b are.

Moreover, for example, the center of the area of illumination of first collimating lens 21a and first collimating lens 21b—that is, the center of first high beam area of illumination 241—is exemplified as being located at the intersection of horizontal line 220 and vertical line 221, but this example not limiting. The center of first high beam area of illumination 241 may be offset from the intersection of horizontal line 220 and vertical line 221 toward oncoming traffic lane 210 or the shoulder of the road In other words, the respective areas of illumination, and centers thereof, formed by first high beam lamp 3a and second high beam lamp 3c are not limited to the above example. Moreover, lighting apparatus 1 may include a third high beam lamp that forms a third area of illumination different in shape from both first high beam area of illumination 241 and second high beam area of illumination 242. In this case, lighting apparatus 1 may include the third high beam lamp as a substitute for first high beam lamp 3b and, alternatively, may include the third high beam lamp in addition to first high beam lamp 3a, first high beam lamp 3b, and second high beam lamp 3c.

Moreover, for example, in the above embodiment, high beam light source module 10 and low beam light source module 13 are exemplified as being vertically offset from each other, hut this example is not limiting. For example, high beam light source module 10 and low beam light source module 13 may be aligned along a single horizontal line. Moreover, both high beam light emitting device 11 and low beam light emitting device 14 may be mounted on a single substrate.

Moreover, for example, in the above embodiment, vehicle body 110 is exemplified as including two lighting apparatuses 1 (two headlights 120), but vehicle body 110 is not limited to this example. For example, vehicle body 110 may include three or more lighting apparatuses 1, such as two lighting apparatuses 1 on the right side and two lighting apparatuses 1 on the left side, and, alternatively, may include only one lighting apparatus 1.

For example, in the above embodiment, lighting apparatus 1 is exemplified as being applied to a headlight that projects a high beam and a low beam, but lighting apparatus 1 may be applied to an auxiliary light such as a fog light or a daylight/daytime running light (DRL).

Moreover, although the automobile is exemplified as a four-wheeled automobile in the above embodiment, the automobile may be other automobiles such as a two-wheeled automobile.

Moreover, in the above embodiment, the light emitting devices are exemplified as LEDs, but the light emitting devices may be semiconductor lasers, organic electroluminescent (EL) devices, or non-organic EL devices.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus for vehicle use that projects light forward, the lighting apparatus comprising:
   a base;
   a low beam lamp including a low beam light emitter disposed on the base;
   a first light emitter disposed on the base;
   a second light emitter;
   a lighting controller configured to turn on the low beam light emitter, the first light emitter, and the second light emitter; and
   an optical system that reflects light from the first light emitter and light from the second light emitter, at least above and below the first light emitter and the second light emitter, to produce a light distribution pattern,
   wherein a center of an area located in a predetermined position in front of and illuminated by the light from the first light emitter and a center of an area located in a predetermined position in front of and illuminated by the light from the second light emitter are horizontally spaced from each other.

2. A lighting apparatus for vehicle use that projects light forward, the lighting apparatus comprising:
   a base;
   a low beam lamp including a low beam light emitter disposed on the base;
   a first light emitter disposed on the base;
   a second light emitter;
   a lighting controller configured to turn on the low beam light emitter, the first light emitter, and the second light emitter; and
   an optical system that reflects light from the first light emitter and light from the second light emitter, at least above and below the first light emitter and the second light emitter, to produce a light distribution pattern,
   wherein a center of an area illuminated by the light from the first light emitter and a center of an area illuminated by the light from the second light emitter are horizontally spaced from each other, and
   wherein a horizontal width of the area illuminated by the light from the second light emitter is greater than a horizontal width of the area illuminated by the light from the first light emitter.

3. The lighting apparatus according to claim 1, wherein the center of the area illuminated by the light from the second light emitter is located a predetermined distance away from an intersection of a vertical line equivalent to a vertical plane passing through an optical axis of the lighting apparatus and a horizontal line at a distance of the lighting apparatus from the ground in a direction toward an oncoming traffic lane.

4. The lighting apparatus according to claim 1, wherein an area defined by the light distribution pattern produced by the first light emitter and the second light emitter includes an area above an area illuminated by light from the low beam light emitter.

5. A lighting apparatus for vehicle use that projects light forward, the lighting apparatus comprising:
   a base;
   a low beam lamp including a low beam light emitter disposed on the base;
   a first light emitter disposed on the base;
   a second light emitter;
   a lighting controller configured to turn on the low beam light emitter, the first light emitter, and the second light emitter;
   an optical system that reflects light from the first light emitter and light from the second light emitter, at least above and below the first light emitter and the second light emitter, to produce a light distribution pattern, wherein a center of an area illuminated by the light from the first light emitter and a center of an area illuminated by the light from the second light emitter are horizontally spaced from each other;
   a first collimating lens that collimates the light from the first light emitter; and
   a second collimating lens that collimates the light from the second light emitter,
   wherein an optical axis of the second collimating lens is oblique with respect to an optical axis of the first collimating lens.

6. The lighting apparatus according to claim 5, wherein the first collimating lens is substantially circular in a front view, and
   the second collimating lens is substantially elliptical in a front view.

7. The lighting apparatus according to claim 1, wherein the first light emitter comprises a plurality of first light emitters, and
   the plurality of first light emitters are horizontally offset from each other.

8. The lighting apparatus according to claim 7, wherein the plurality of first light emitters are vertically offset from each other.

9. The lighting apparatus according to claim 1, wherein the first light emitter and the second light emitter are vertically offset from each other.

10. An automobile comprising:
    the lighting apparatus according to claim 1;
    a vehicle body including the lighting apparatus in a front of the vehicle body portion; and
    an engine controller connected to the lighting controller.

* * * * *